Nov. 27, 1951  R. W. JACOB  2,576,345
STRADDLE LIFT TRUCK
Filed May 6, 1948  3 Sheets-Sheet 1
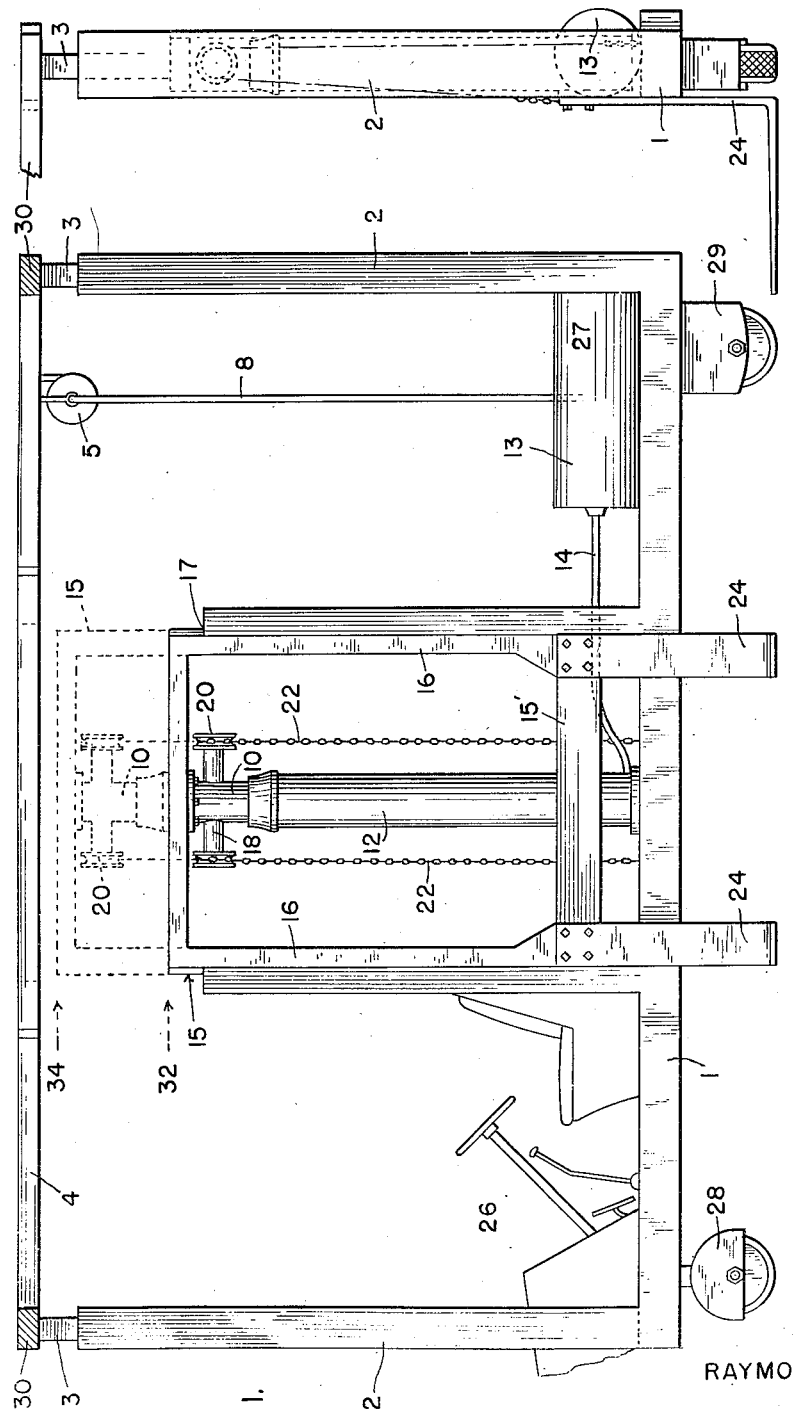
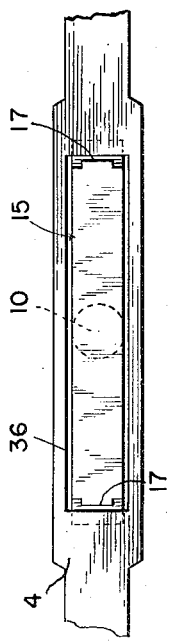
Inventor
RAYMOND W. JACOB
Cushman, Darby & Cushman
Attorneys

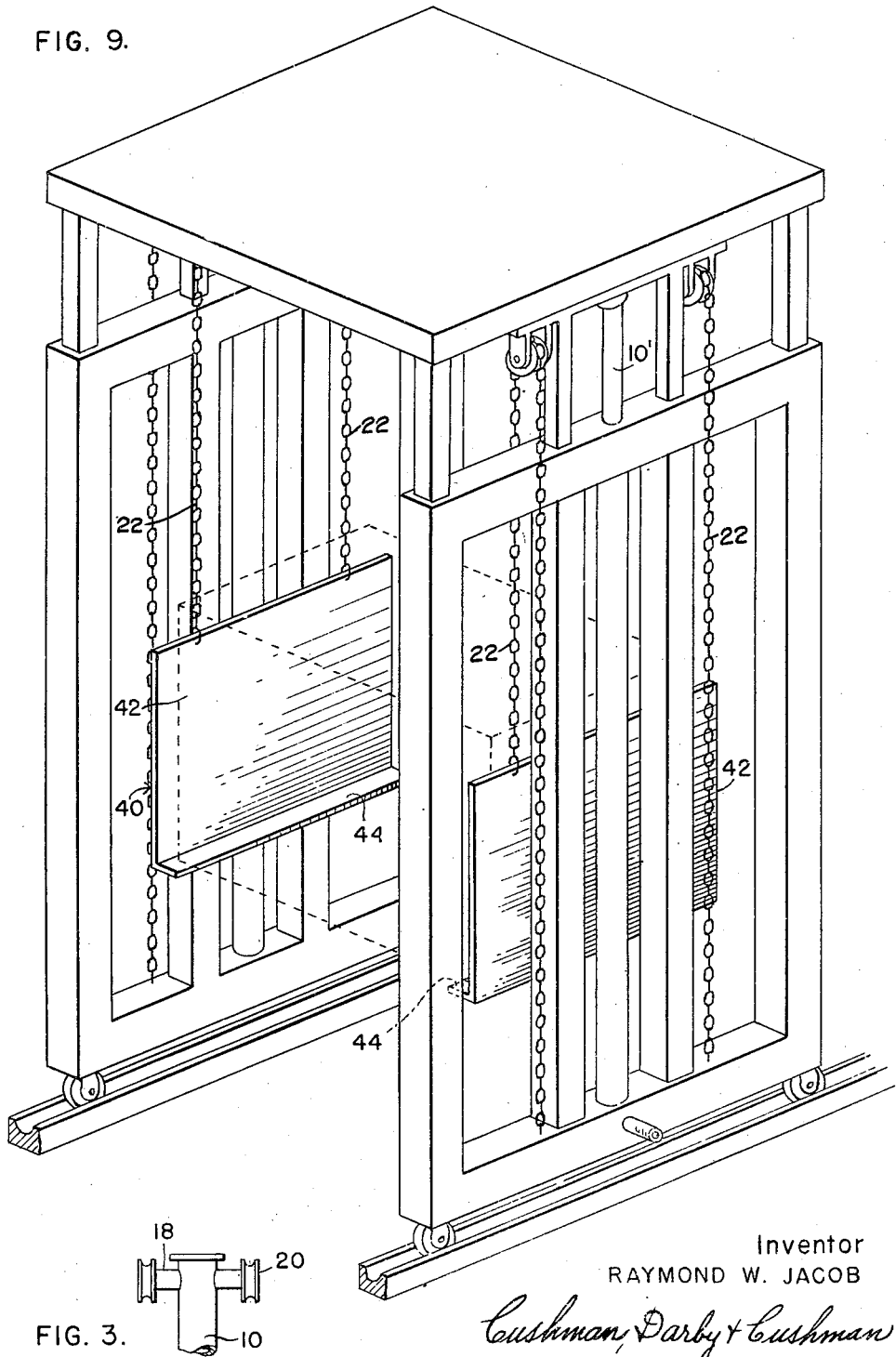

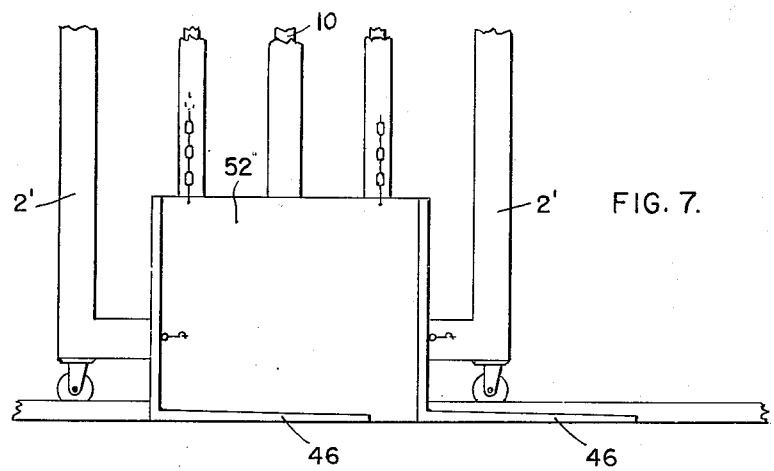
FIG. 7.
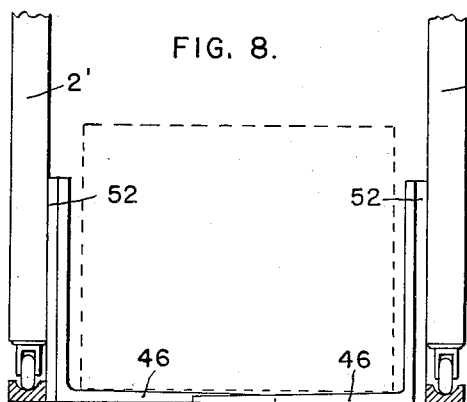
FIG. 8.
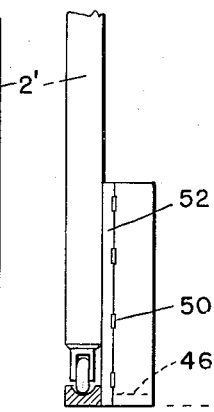
FIG. 5.
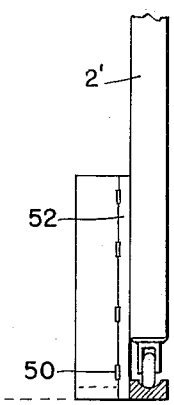
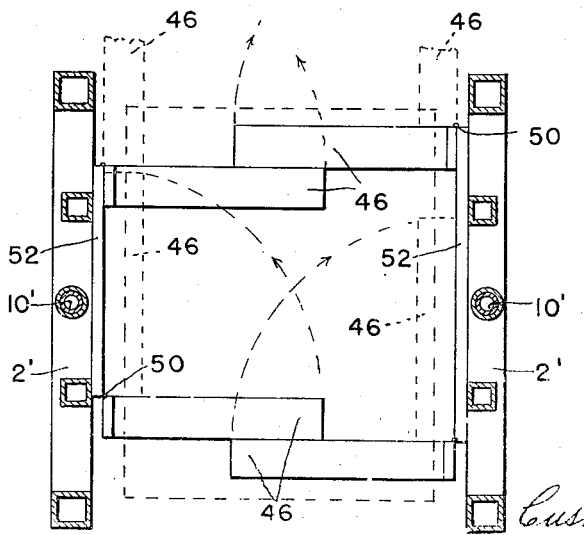
FIG. 6.
Inventor
RAYMOND W. JACOB
Cushman, Darby & Cushman
Attorneys Patented Nov. 27, 1951

2,576,345

UNITED STATES PATENT OFFICE 2,576,345

STRADDLE LIFT TRUCK

Raymond W. Jacob, Chicago, Ill.

Application May 6, 1948, Serial No. 25,395

2 Claims. (Cl. 214—75)

This invention relates to a material handling device and in particular to one that is adapted for the stacking and unstacking of lumber and loaded pallets.

In any material handling area whether it is a lumber yard or a warehouse, it is desirable to have loading machines that require as little space as possible for maneuvering. The machine of this invention achieves this result by straddling a row of material to be handled, thus making wide passageways between rows unnecessary.

The principal object of this invention is to provide a material handling machine that is adapted to load and unload material from any one of several rows of adjacent stacks, said rows having a minimum space therebetween.

Another object of this invention is to provide a loading device capable of straddling a row of material to be loaded, unloaded or transported.

Another object of this invention is to provide a machine for loading, unloading, and transporting material the lifting members of which move a distance that is a multiple of that moved by the actuating mechanism.

Reference is made to the drawings:

Figure 1 is a central, substantially vertical section showing the parts of a general embodiment of this invention in elevation.

Figure 2 shows an end view of the lift.

Figure 3 is a fragmentary view of a detail of Figure 1.

Figure 4 is a partial plan view of an alternative construction of the top frame of Figure 1.

Figure 5 shows an end view of one type of lifting claw in its traveling position.

Figure 6 shows a top view of one type of lifting claw in its carrying position.

Figure 7 shows an outward looking inside view of the lifting claws in their traveling position.

Figure 8 shows an end view of one type of lifting claw in carrying position.

Figure 9 is a perspective view of a modified form of a loading device of this invention particularly adapted for loading small packages.

Figure 1 of the drawings shows a view of one side of the lift which comprises a longitudinal base member 1 on which are mounted uprights 2 adapted to receive in sliding relation vertical member 3, and these are in turn connected by top longitudinal member 4. Reel 5, suspended therefrom, is adapted to carry flexible fluid pressure lines 8 to the other side of the lift and to keep them taut as member 4 goes up or down. Piston 10 is mounted in a cylinder 12 that is centrally located on longitudinal member 1 and it is actuated by hydraulic pump 13, the fluid being delivered through hydraulic line 14 to the base of the cylinder. Frame 15 is secured to the top of the piston and its vertical member 16 rides in channel 17. Cross member 18 is mounted near the top of the piston and supports sheaves 20 in which chains or cables 22 ride. The inside ends of the cable or chains are attached to the lifting claws 24 and the outside ends are attached to the longitudinal bottom frame 1. Steering and power controls shown generally at 26 can be provided if desired, the power plant being located rearwardly of hydraulic pump 13 as shown. A steerable wheel 28 of a conventional design is secured at the forward end of longitudinal member 1 and power driven wheels 29 are mounted at the rear of longitudinal member 1. These wheels can be cased in rubber tires or can be adapted to guidance by tracks. In the event that this mechanism is not self-motivated, the wheels can be in the form of casters which are adapted to ride on tracks or encased in rubber tires. The other side of this lift mechanism not shown in the drawings is substantially the same as the one which is described, with the exception that no steering controls, hydraulic pump, or power plant need be provided. The two sides are held in vertical position so as to be able to straddle a given load by cross members 30 connected between vertical members 3 at front and rear. The piston on the second side is provided with hydraulic pressure by the hydraulic line 8 carried on reel 5. Upon application of pressure to the pistons, they raise framework 15 and lifting claws 24, and due to the way in which the chains or cables 22 are connected, the latter rises twice as far as the former. The top members 4 and uprights 3 remain in position until frame 15 has risen from position 32 to position 34 or until the top of the load engages cross member 30, whichever occurs first. The purpose of providing means for raising the top member 4 is to provide horizontal shielding and supporting devices on either side of the load. Horizontal frame members in this position will prevent accidental displacement of the load. Furthermore, if the load is top heavy the members 4 serve to prevent the same from topping off the top of the carrier.

The ratio between the movement of the frame 15 and the lifting claws 24 can be increased to any desired multiple by the use of additional pulleys.

Figure 4 shows an optional design in which the frame 15 does not engage the top member 4 but is permitted to pass through an opening 36 therein. In this design, the top members 4 are permanently secured to the uprights 2 and upward movement of the piston is limited by its length or by the load striking the cross members 30.

The lifting claws 40 shown in Figure 9 are such as would be used in handling pallets or other laterally rigid stacks of material and are comprised of L shaped plates having sides 42 and toes 44. Each of these L shaped load supporting members as is shown in Figure 9 depends loosely and is supported by a chain 22. It is to be understood that the length and shape of these toes can be altered to suit the configuration of the particular material being handled. In operation, the toes 16 are held under an edge of material to be lifted until they carry enough weight to prevent them from swinging apart and dropping the load.

Another type of lifting claw peculiarly adapted to use with a material handling device of this invention when it is employed in lifting lumber or other material lacking lateral rigidity is illustrated in Figures 5 through 8. In order that the machine can straddle stacks of such material and at the same time provide a movable lateral support with which to lift said material, a lifting claw is provided with toes 46 which swing in a horizontal plane on hinges 50 that are attached to vertical plate 52. Thus when the machine is in transit or passing along an intermediate row of material, the toes are swung parallel to side 1 as is shown in Figure 5 and Figure 7. After the machine is in position over a stack to be handled, the claws are adjusted to the proper level, unclamped and swung under the load into the position shown in Figures 6 and 8. Piston 10 is raised a sufficient height for the claws to clear the highest stack in the row, and the machine is ready to transport the stacks to whatever point is desired. In order that a firm support be secured, toes 46 are made long enough to extend more than halfway between the sides 1 and 2. One set of toes is closer together than the other as is shown in Figure 6 because otherwise there would be interference between the toes as they are swung inwardly in the same horizontal plane.

In conclusion, I have disclosed a device for loading, unloading, and transporting material that is easy to operate and requires a minimum of space for maneuvering.

I claim:

1. A material handling device comprising two parallel vertical frames, wheels attached to the bottom of said frames, a horizontal framework, means for mounting said framework in sliding relation with respect to the vertical frames, an hydraulic pump mounted on one of the vertical frames, a source of power for actuating said pump, a first vertical cylinder mounted on the same vertical frame as the pump, a second cylinder mounted on the opposite vertical frame, means for conducting hydraulic fluid from the pump to said first cylinder, a flexible tube for conducting hydraulic fluid from the hydraulic pump to said second cylinder, means mounted on said horizontal framework for taking up the slack in said flexible tube, pistons mounted in said first and second cylinders, means for guiding said pistons, pulley systems mounted at the tops of each of said pistons, separate chains passing through said pulley systems, one end of each chain being secured to its respective vertical frame, and the other end being secured to a lifting claw.

2. A material handling device comprising two parallel vertical sides mounted on casters, a horizontal framework rigidly connected to the tops of said sides, an hydraulic pump, power means for actuating said pump, hydraulic pistons vertically mounted in said sides, cylinders for holding said pistons, means for connecting said cylinders to said hydraulic pump, pulleys mounted on either side of said pistons with their plane of rotation at right angles to said sides, chains secured to said vertical sides at one end and to lifting claws at the other, said chains passing over said pulleys in such manner that the lifting claws move a distance that is a whole multiple of the distance moved by said pistons, openings in the tops of said sides, said openings being sufficiently large to permit the piston and the pulleys to pass through it.

RAYMOND W. JACOB.

REFERENCES CITED

The following references are of record in the file of this patent:

UNITED STATES PATENTS

| Number | Name | Date |
|---|---|---|
| 758,493 | Abbey | Apr. 26, 1904 |
| 1,382,328 | Stone | June 21, 1921 |
| 1,390,837 | Stubbe | Sept. 13, 1921 |
| 1,480,257 | Gerlinger | Jan. 8, 1924 |
| 1,633,024 | Kofford | June 21, 1927 |
| 2,166,479 | Ruddock | July 18, 1939 |
| 2,178,370 | Dunham | Oct. 31, 1939 |
| 2,259,558 | Evans | Oct. 21, 1941 |
| 2,438,277 | Fife et al. | Mar. 23, 1948 |
| 2,512,333 | Jaffa et al. | June 20, 1950 |

FOREIGN PATENTS

| Number | Country | Date |
|---|---|---|
| 81,346 | Austria | Sept. 25, 1920 |